United States Patent [19]

Meadors

[11] 3,917,205

[45] Nov. 4, 1975

[54] CONNECTOR FOR TRAFFIC SIGNAL LIGHTS

[75] Inventor: Danny Meadors, Oklahoma City, Okla.

[73] Assignee: Southwestern Electric Company, Inc., Oklahoma City, Okla.

[22] Filed: Apr. 8, 1974

[21] Appl. No.: 458,751

[52] U.S. Cl. ............................. 248/229; 248/231
[51] Int. Cl.² ............................. F16M 13/00
[58] Field of Search ......... 248/41, 214, 221, 226 D, 248/229, 230, 231; 403/68, 73, 97

[56] References Cited
UNITED STATES PATENTS

| | | | |
|---|---|---|---|
| 1,074,272 | 9/1913 | Kline | 248/229 |
| 1,352,647 | 9/1920 | Benton | 248/229 |
| 1,697,710 | 1/1929 | Bostroem | 403/97 |
| 1,706,215 | 3/1929 | Davidson | 403/97 |
| 2,179,251 | 11/1939 | DeRight | 248/229 |
| 2,555,226 | 5/1951 | Draughn | 403/73 |
| 3,484,066 | 12/1969 | Aunspaugh | 248/229 |
| 3,586,280 | 6/1971 | Parduhn | 248/214 |

*Primary Examiner*—William H. Schultz
*Attorney, Agent, or Firm*—William S. Dorman

[57] ABSTRACT

A connector for securing the signal arm of a traffic signal device in fixed, spaced relation with respect to the mastarm which comprises a generally Y-shaped clamp having a hollow cylindrical base and a pair of divergent legs with clamping means at the ends of the legs for securing the clamp to the signal arm and a mastarm clamp having a pair of transversely extending ears with a central concave portion therebetween, and a cylindrical hub connected to the central cancave portion. The mastarm clamp also includes a pair of cables which extends from one transversely extending ear around the mastarm to the other transversely extending ear with means for tightening the cables around the mastarm. The cylindrical base of the signal arm clamp is provided with a cylindrical recess adapted to receive the cylindrical hub of the mastarm clamp. The forward surface of the cylindrical hub is provided with radial serrations which are adapted to mate with radial serrations on the bottom surface of the cylindrical recess. A bolt extends axially through the cylindrical hub and the cylindrical base and is provided with a nut at one end thereof to permit the tight securing of the cylindrical hub in the cylindrical base.

1 Claim, 4 Drawing Figures

CONNECTOR FOR TRAFFIC SIGNAL LIGHTS

BACKGROUND OF THE INVENTION

1. Field of the Invention

The present invention relates to a connector means for connecting one elongated longitudinally extending member in fixed, spaced relation to another elongated longitudinally extending member. More particularly the present invention relates to a connector for connecting a signal arm of a traffic signal light to a mastarm.

2. Description of the Prior Art

There are many different types of brackets, connectors, etc., for connecting signal lights to mastarms. One such bracket is described and illustrated in Parduhn Pat. No. 3,586,280, issued on June 22, 1971. Another mastarm bracket is shown in Parduhn Pat. No. 3,764,099, issued on Oct. 9, 1973. In the first Parduhn patent the clamp means attachment to the signal arm comprises a hollow sleeve which has to be slipped over the signal arm before the latter is secured to the signal light assembly. Also this sleeve member is secured to the signal arm by means of a pair of set screws. In both Parduhn patents the signal arm clamp is connected to the mastarm clamp through a threaded connection; as far as the first Parduhn patent is concerned, it would be possible to rotate the signal arm clamp with respect to the mastarm clamp at any time through this threaded connection; in the second Parduhn patent, provision is made for a set screw passing through the threaded connection to lock the signal arm clamp with respect to the mastarm clamp.

SUMMARY OF THE INVENTION

The present invention relates to a connector of the type referred to above for connecting a signal arm, for example, in fixed, spaced relation with respect to a mastarm, for example. The connector is comprised of two main parts, including a signal arm clamp and a mastarm clamp. The signal arm clamp is a generally Y-shaped member with a hollow cylindrical base and a pair of divergent legs. At the ends of each of the legs are a pair of transversely extending ears having a concave arcuate portion therebetween. Opposite the ears is a separate clamp member having ear portions and a central concave arcuate portion facing towards the concave arcuate portion of the leg. Several bolts pass through the ears and ear portion to secure the legs of the Y-shaped member to the signal arm.

The mastarm clamp comprises a pair of transversely extending ears connected to each other through a central concave portion. The central concave portion has longitudinal serrations which are adapted to engage the cylindrical surface of the mastarm. A pair of cables extend from one ear of the mastarm clamp around the mastarm to the other ear of the mastarm clamp and means are provided to tighten the cables around the mastarm.

For the purpose of connecting the signal arm clamp to the mastarm clamp, the mastarm clamp is provided with a central cylindrical hub connected to the central concave portion. The central cylindrical hub has an outer diameter equal to the inner diameter of the cylindrical recess in the hollow cylindrical base of the signal arm clamp. The bottom of the cylindrical recess is provided with a substantially flat surface also having radial serrations therein and adapted to mate with the radial serrations in the cylindrical recess when the cylindrical hub is received in the cylindrical base. Finally, a bolt extends axially through the cylindrical hub and the cylindrical base with a nut being provided on the end of the bolt. When the nut is tightened on the bolt, the two serrated surfaces finally engage to prevent the relative rotation of the signal arm clamp with respect to the mastarm clamp.

DETAILED DESCRIPTION OF A PREFERRED EMBODIMENT OF THE INVENTION

Figures 1, 2, 3:
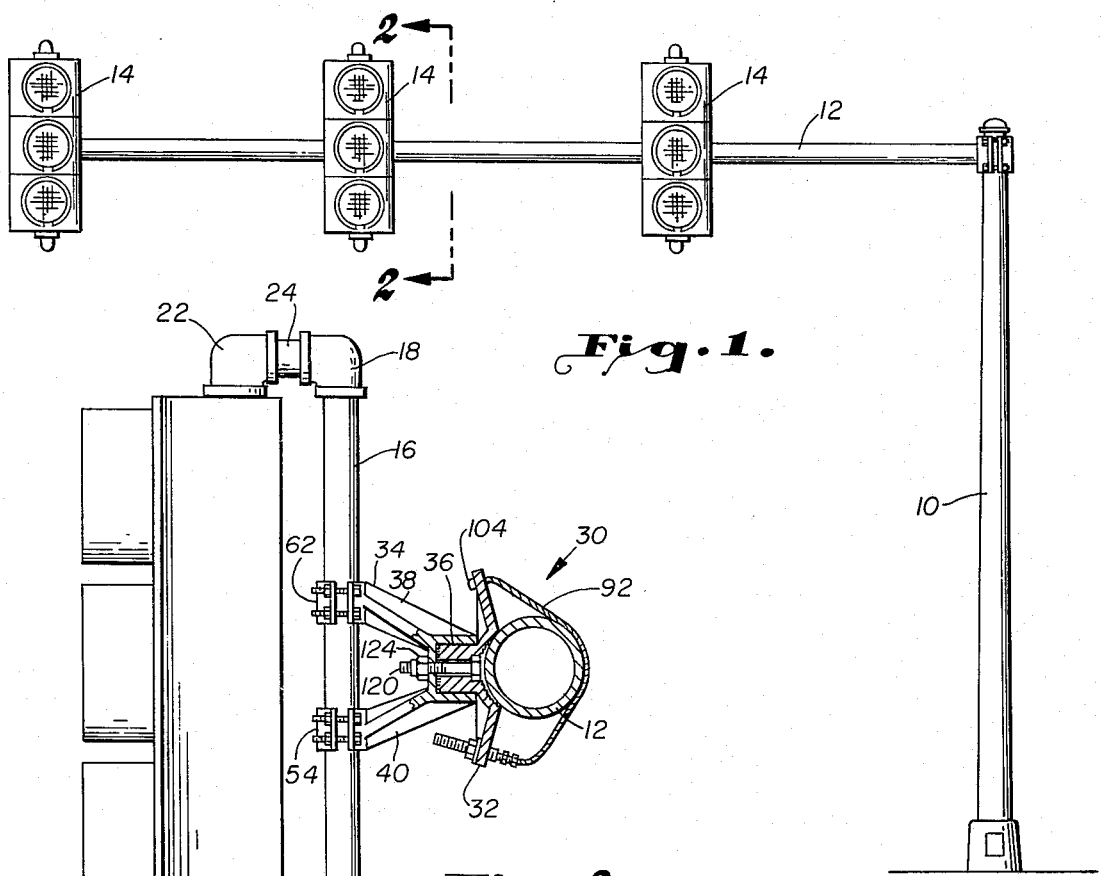
FIG. 1 is a front view of a traffic signal pole with a horizontal mastarm having traffic signal lights mounted thereon.
FIG. 2 is an enlarged cross-sectional view taken along section line 2—2 of FIG. 1.
FIG. 3 is a perspective of the elements shown in FIG. 2.

FIG. 1 shows a typical or conventional vertical signal pole 10 at the top of which is mounted a conventional horizontal mastarm 12. On the mastarm 12 are mounted a plurality of conventional traffic signal heads or fixtures 14.

Referring now to FIGS. 2 and 3, each signal head or fixture 14 is mounted on a signal arm 16 in the following manner. The signal arm 16 is an elongated vertical member having an elbow 18 connected at the top and a tee 20 connected at the bottom. The elbow 18 connects with another elbow 22 through a nipple 24. The left hand end of the tee 20 connects to another elbow 26 through a nipple 28. The elbows 22 and 26 are connected to the top and bottom, respectively, of the light fixture 14 so that the light fixture can be pivoted along a vertical axis through the connections with the elbows 22 and 26. Also shown in FIGS. 2 and 3 is a mastarm connector generally designated by the reference character 30. The mastarm connector includes a mastarm clamp 32 and a signal arm clamp 34.

Figure 4:
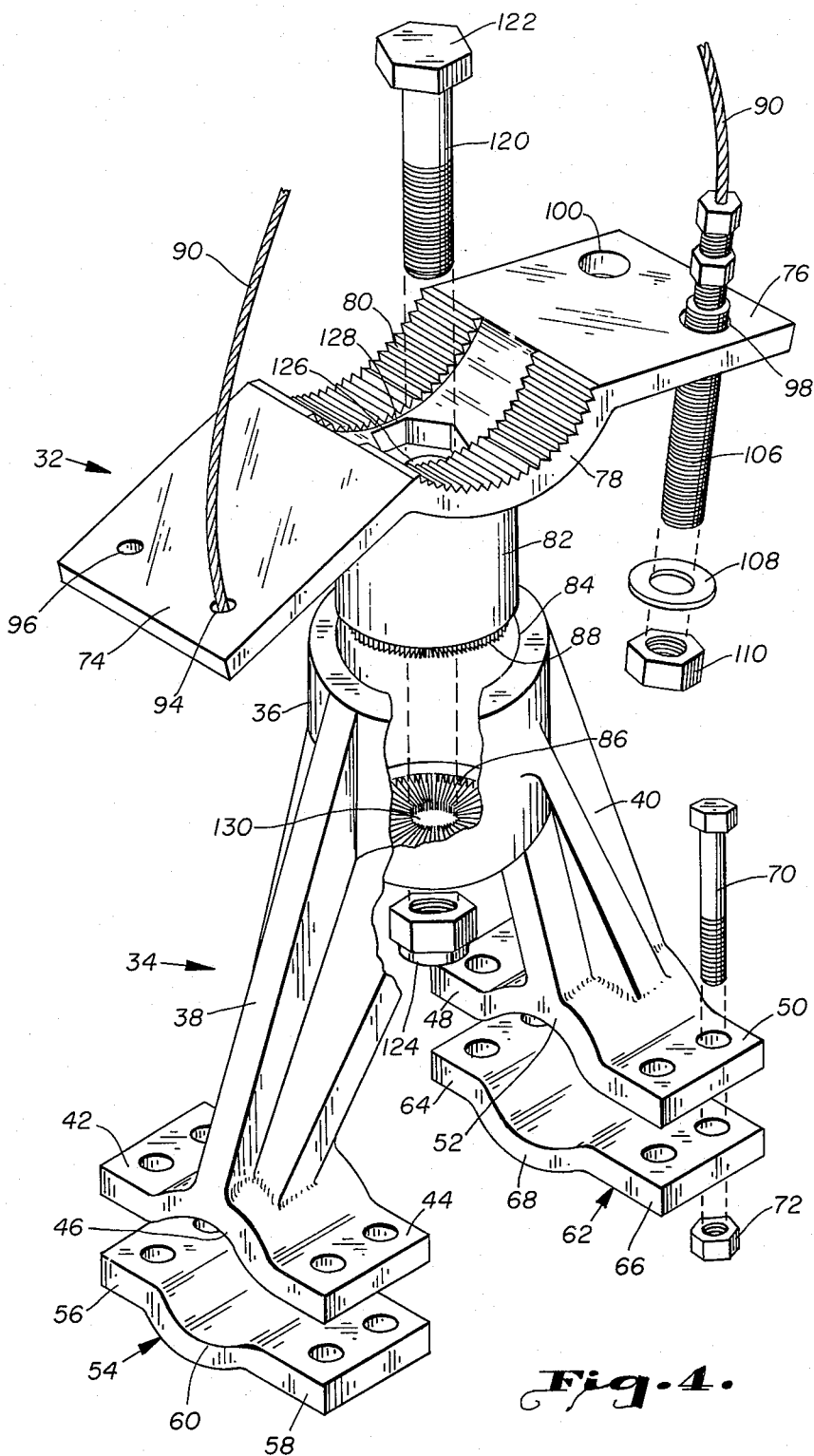
FIG. 4 is an exploded view, on an enlarged scale, of the mastarm connector shown in FIGS. 2 and 3.

Referring also to FIG. 4, the signal arm clamp 34 is a generally Y-shaped member comprised of a hollow cylindrical base 36, and a pair of divergent legs 38 and 40. At the end of the leg 38 are a pair of transversely extending ears 42 and 44, having a concave arcuate portion 46 therebetween. Similarly, at the end of the leg 40 are a pair of ears 48 and 50 extending transversely outwardly from the leg and having a concave arcuate portion 52 therebetween. Opposite the ears 42 and 44 is a separate clamping member 54 having ear portions 56 and 58 and a central concave arcuate portion 60 facing upwardly towards the concave portion 46. Similarly, opposite the ears 48 and 50 is a separate clamping member 62, having ear portions 64 and 66 and a central concave arcuate portion 68 facing upwardly towards the concave portion 52. The concave portions 46 and 60, on the one hand, and the concave portions 52 and 68, on the other hand, are adapted to receive the signal arm 16 therebetween, as best shown in FIG. 2. The members 54 and 62 are held tightly in position against the ears 42 and 46 and ears 48 and 50 by means of a plurality of bolts 70 and nuts 72, only one each of which is shown in FIG. 4.

The mastarm clamp 32 comprises a pair of transversely extending ears 74 and 76 connected to each other through a central concave portion 78. The concave portion 78 is provided with longitudinal serrations 80, adapted to bite into the cylindrical surface of the mastarm 12 when the mastarm connector is properly fixed in position, as will hereinafter appear. The mastarm connector 32 (as it appears in FIG. 4) also includes a central cylindrical hub 82 projecting vertically downwardly from the central concave portion 78. The cylindrical base portion 36 of the signal arm bracket 34 is provided with a central bore 84 of sufficient size to accommodate the hub 82. The bottom of the bore 84 is provided with radial serrations 86, which are adapted to cooperate with similar radial serrations 88 on the bottom of the hub 82.

For the purpose of securing the mastarm clamp 32 to the mastarm 12, the mastarm clamp 32 is provided with a pair of cables 90 and 92. The ear 74 is provided with a pair of relatively smaller holes 94 and 100. One end of the cable 94 is provided with an enlarged portion 102, and the corresponding end of the cable 92 is provided with an enlarged portion 104; the enlarged portions 102 and 104 are sufficiently large that they cannot pull through the holes 94 and 96, respectively. The opposite end of cable 90 is connected to an enlongated threaded member 106, which is of sufficient diameter to pass through the opening 98. A washer 108 can be received over the member 106 and a nut 110 can be threaded on the end of the member 106. The corresponding end of the cable 92 is connected to a member (not shown) similar to the threaded member 106, and having a washer and nut (not shown) similar to the washer 108 and nut 110.

As best shown in FIG. 4, the position of the mastarm clamp 32 can be secured in the proper angular relation with respect to the signal arm clamp 34 by means of a bolt 120 with a hex head 122 and a nut 124 which is threadedly received on the bolt 120 opposite from the nut 124. The mastarm clamp 32 is provided with the vertical bore 126 of sufficient diameter to receive the shank of the bolt 120. The upper end of the bore 126 is provided with a hexagonally shaped recess 128 adapted to conform with the shape of the head 122. A hole 130 is provided at the lower end of the bore 84 to permit the passage of the shank of the bolt 120 therethrough. With the bolt received through the holes 126 and 130, with the nut 124 loosely on the end of the bolt 120, and further, with the splines 88 being spaced from the splines 86, the mastarm clamp 82 can be angularly adjusted by rotating the same relative to the signal arm clamp 34 around the axis of the bolt 120. When the proper angular position is reached, the nut 124 can now be tightened so that the splines 88 engage the splines 86 to lock the mastarm clamp 32 against the signal arm clamp 134 in the angular position selected.

To place a light fixture in position on the mastarm 14, for example, the signal arm bracket can be secured to the signal arm 16, as shown in FIG. 2 with the nuts 72 finger-tight. Thereafter, the cables 90 and 92 are placed around the mastarm 12 and the nuts 110 are tightened finger-tight on the members 106. The mastarm clamp can now be moved horizontally along the mastarm 12 to the proper position and the signal arm 16 can be moved vertically and rotationally with respect to the signal arm clamp 34 until the desired orientation of the light fixture 14 is achieved, at which time the nuts 72 and 110 can be tightened with a wrench.

The details of the electrical connection to the light fixtures 14 are considered conventional and, hence, are not shown. However, electrical leads can be introduced into the interior of the light fixture 14 through a wiring connector 112 which is fitted into the end of the tee 20 opposite from the nipple 28.

The main parts of the connector are generally made from iron or steel because of the rugged service to which the invention will be put. However, there are some rugged plastic materials available today which could withstand the same conditions of service, and, hence, applicant wishes no limitations to be imposed upon the invention as regards materials of construction. Preferably, the bottom of the bore 84 is relatively flat with radial serrations 86 therein; similarly, the forward or lower surface of the hub 82 is essentially flat with radial serrations 88 therein. However, the bottom of the bore 84 could be provided with a concave serrated surface while the end of the hub 82 could be provided with a similarly shaped convex serrated surface. Likewise, the two intermating surfaces could be knurled, if desired, within the meaning of the term "serrations," just so long as a plurality of different angular positions is possible for one clamp member with respect to the other.

Whereas the present invention has been described in particular relation to the drawings attached hereto, it should be understood that other and further modifications, apart from those shown or suggested herein, may be made within the spirit and scope of this invention.

What is claimed is:

1. An apparatus for securing a first longitudinally extending member in fixed spaced and offset relation with respect to a second longitudinally extending member comprising, a first clamping device having clamping means thereon for securing said first clamping device to said first elongated member, a second clamping device having clamping means thereon for securing said second clamping device to said second elongated member, said first clamping device having a cylindrical recess therein, said cylindrical recess having a bottom surface with radial splines thereon, said second clamping device having a cylindrical projection adapted to be received in said cylindrical recess, said cylindrical projection having a forward surface at one end thereof with radial splines thereon adapted to engage the radial splines on the bottom surface of said cylindrical recess, and means for securing said cylindrical projection in said cylindrical recess to prevent relative rotation between said cylindrical projection and said cylindrical recess, said forward and bottom surfaces being substantially flat with radial splines thereon, and said first clamping device being a generally Y-shaped member having a hollow cylindrical base with a pair of divergent legs extending outwardly therefrom, wherein said cylindrical base contains said cylindrical recess and wherein the means for clamping said first clamping device to said first elongated member comprises a pair of clamping members cooperating with the ends of said legs for engaging said first elongated member, and wherein said second clamping device includes a pair of transversely extending ears connected to each other through a central concave portion, and wherein said central concave portion is connected to a central cylindrical hub constituting said cylindrical projection, and wherein the means for clamping said second clamping device to said second elongated member includes a pair of cables connected to one transversely extending ear around said second elongated member to the other of said transversely extending ears and means operatively connected with said cables and with said other transversely extending ear to tighten said cables on said second transversely extending member.

* * * * *